Jan. 17, 1956 S. INNOCENTI 2,731,205
AUTOMATIC TICKET PRINTING AND ACCOUNTING MACHINE
Filed July 27, 1953 9 Sheets-Sheet 1

Jan. 17, 1956  S. INNOCENTI  2,731,205
AUTOMATIC TICKET PRINTING AND ACCOUNTING MACHINE
Filed July 27, 1953  9 Sheets-Sheet 4
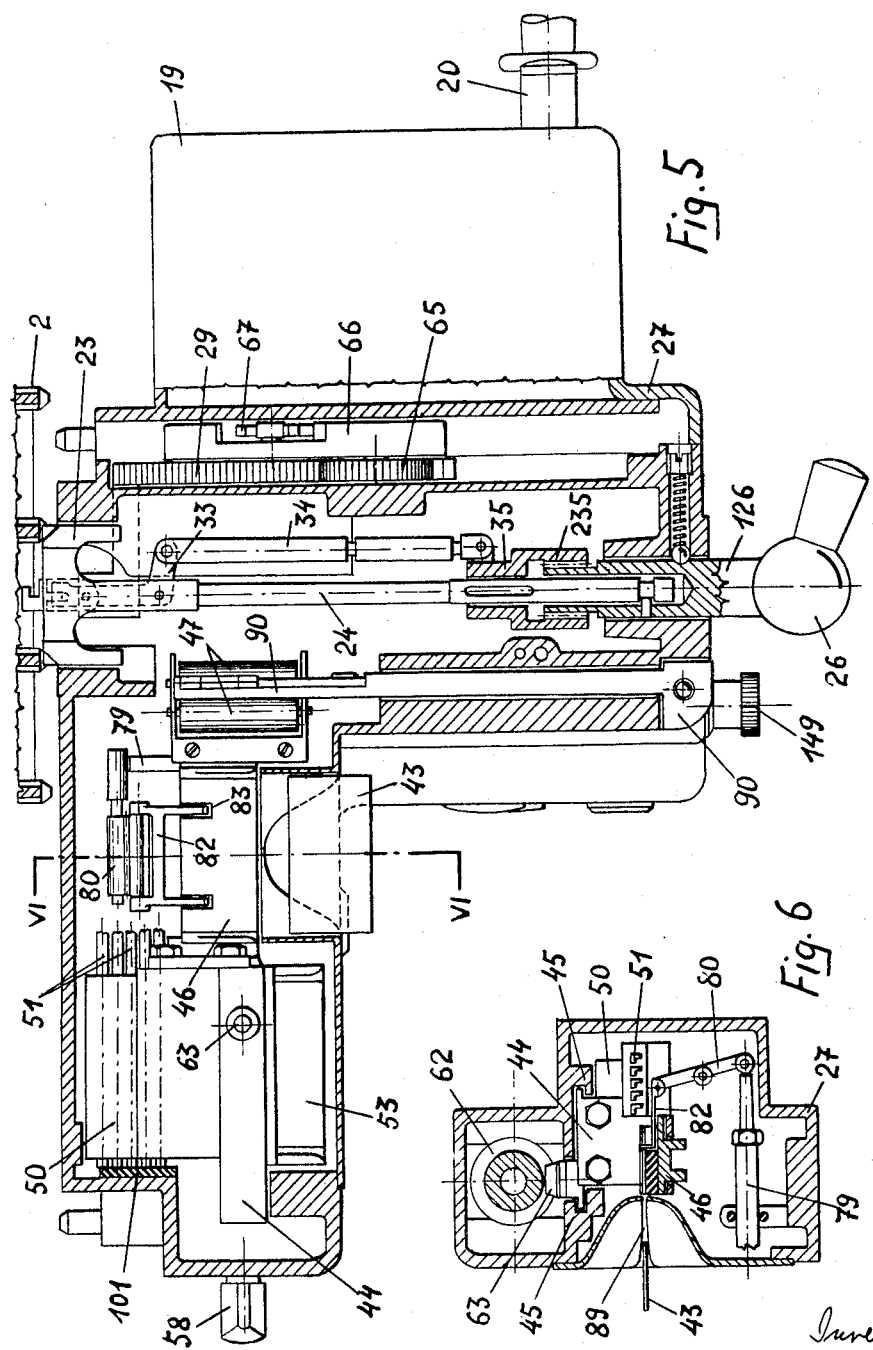

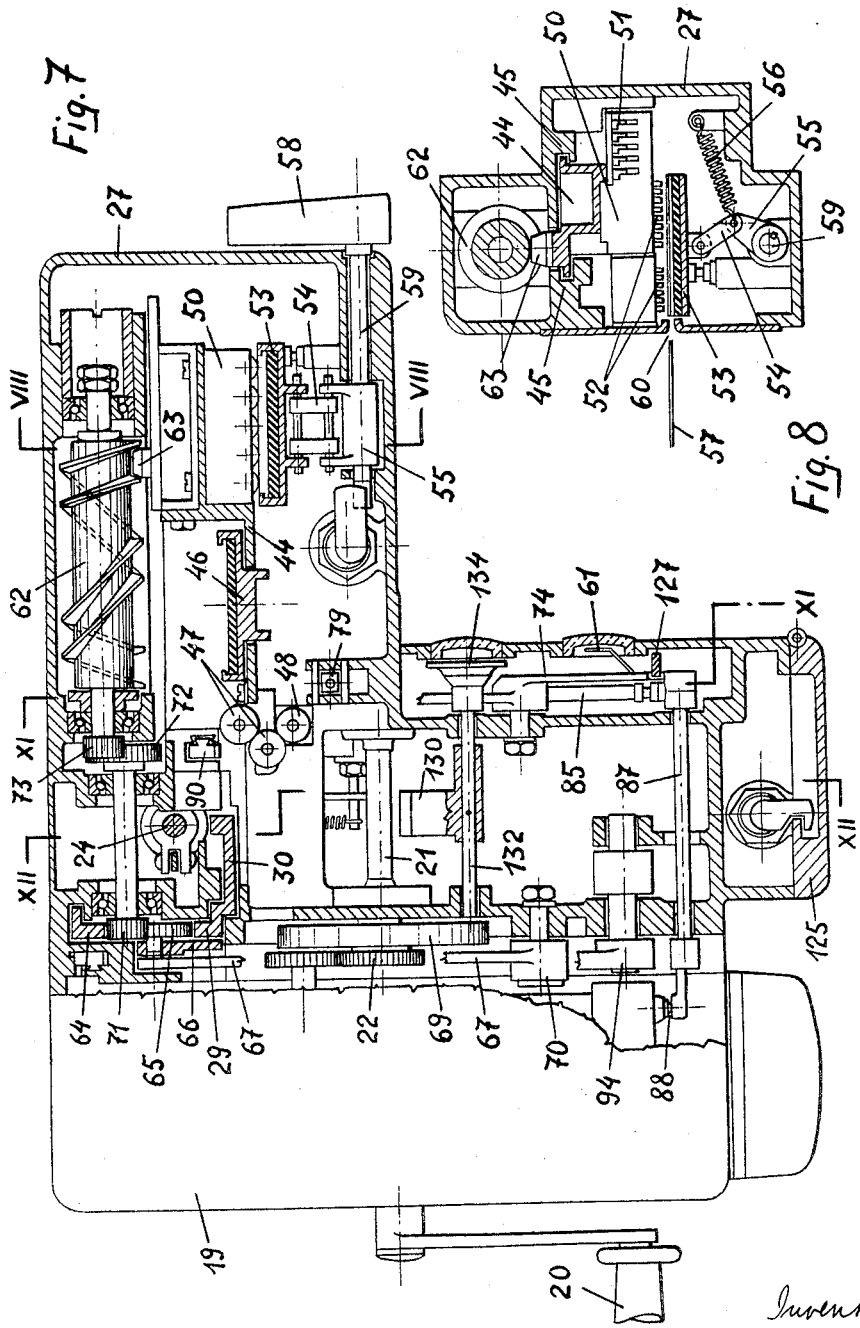

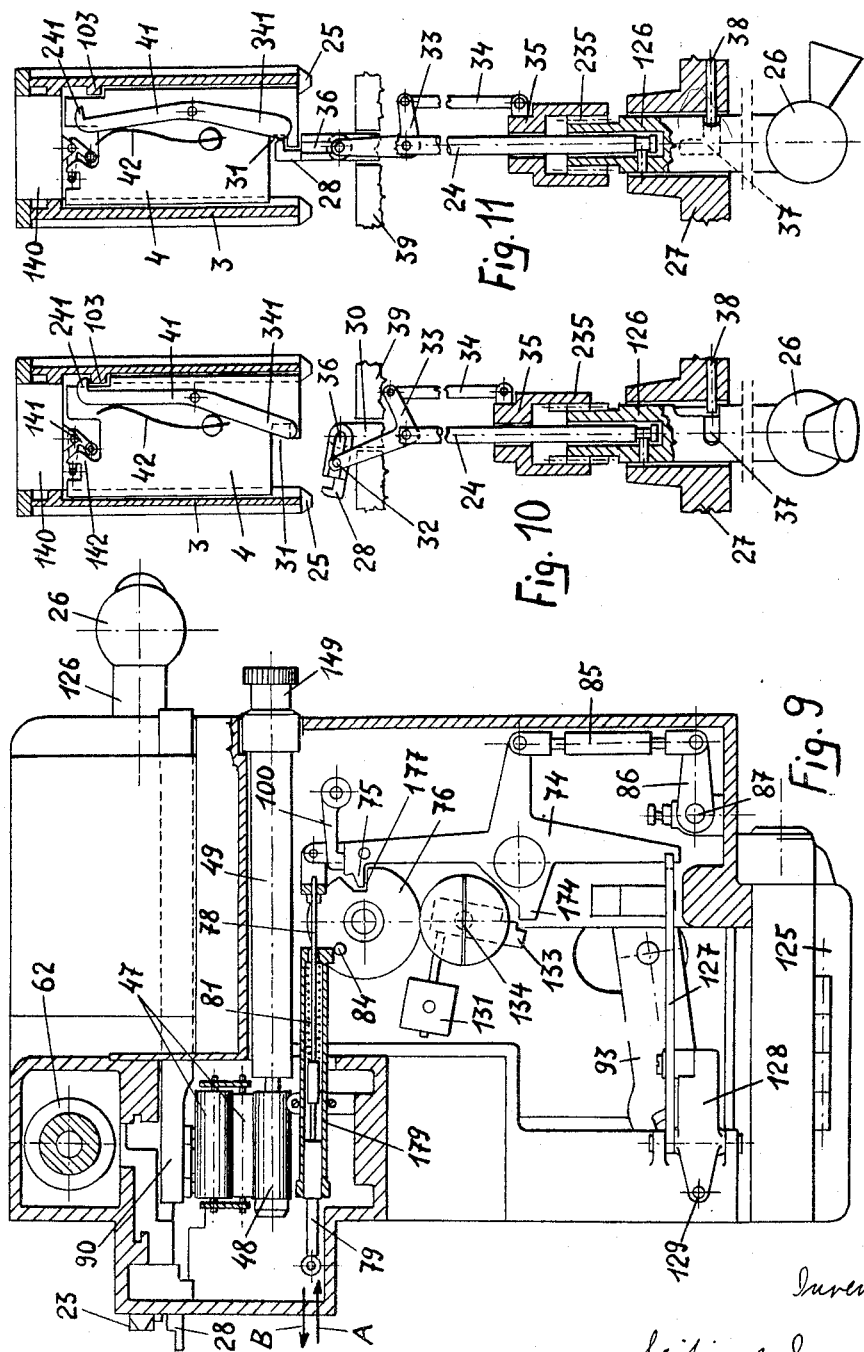

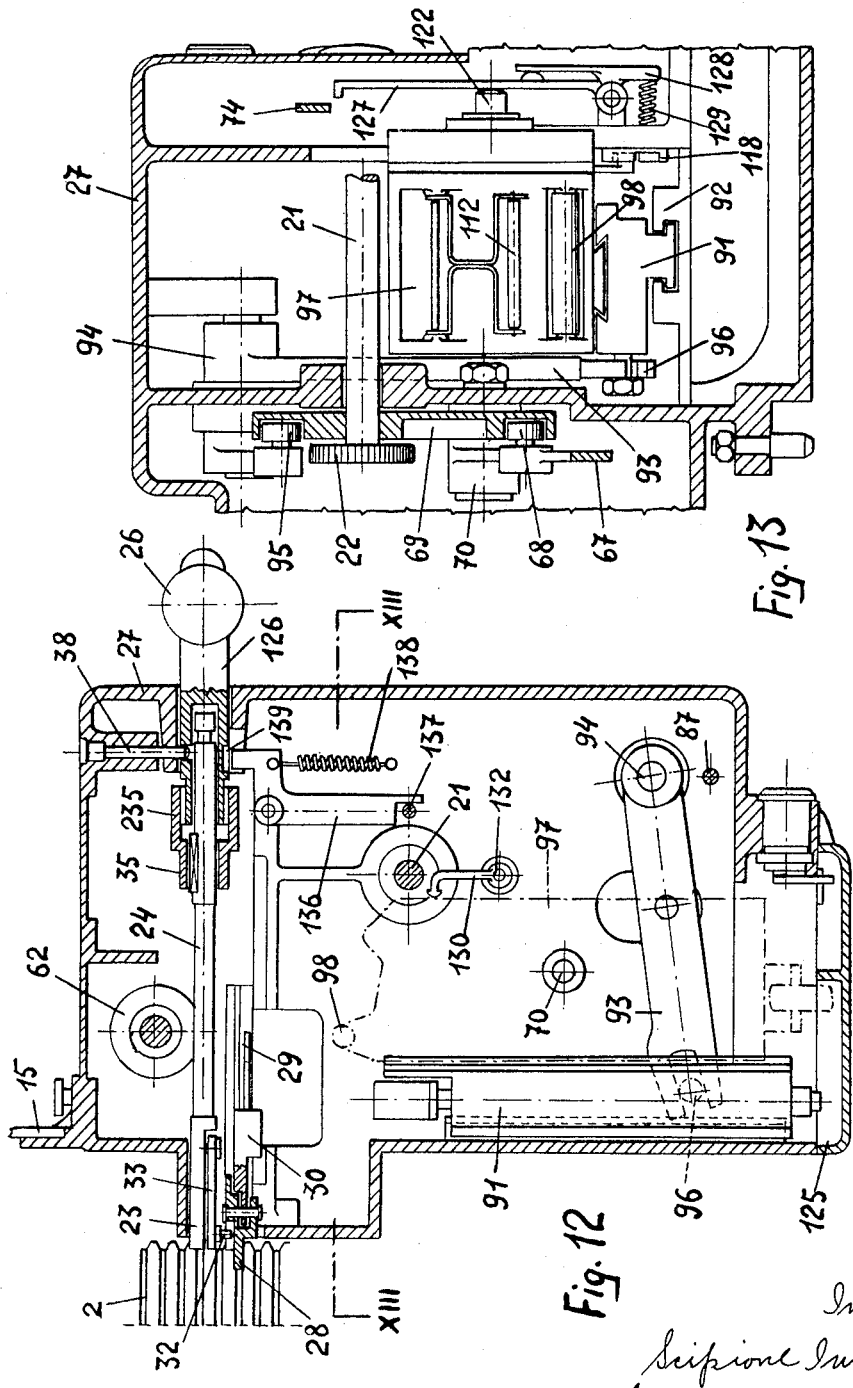

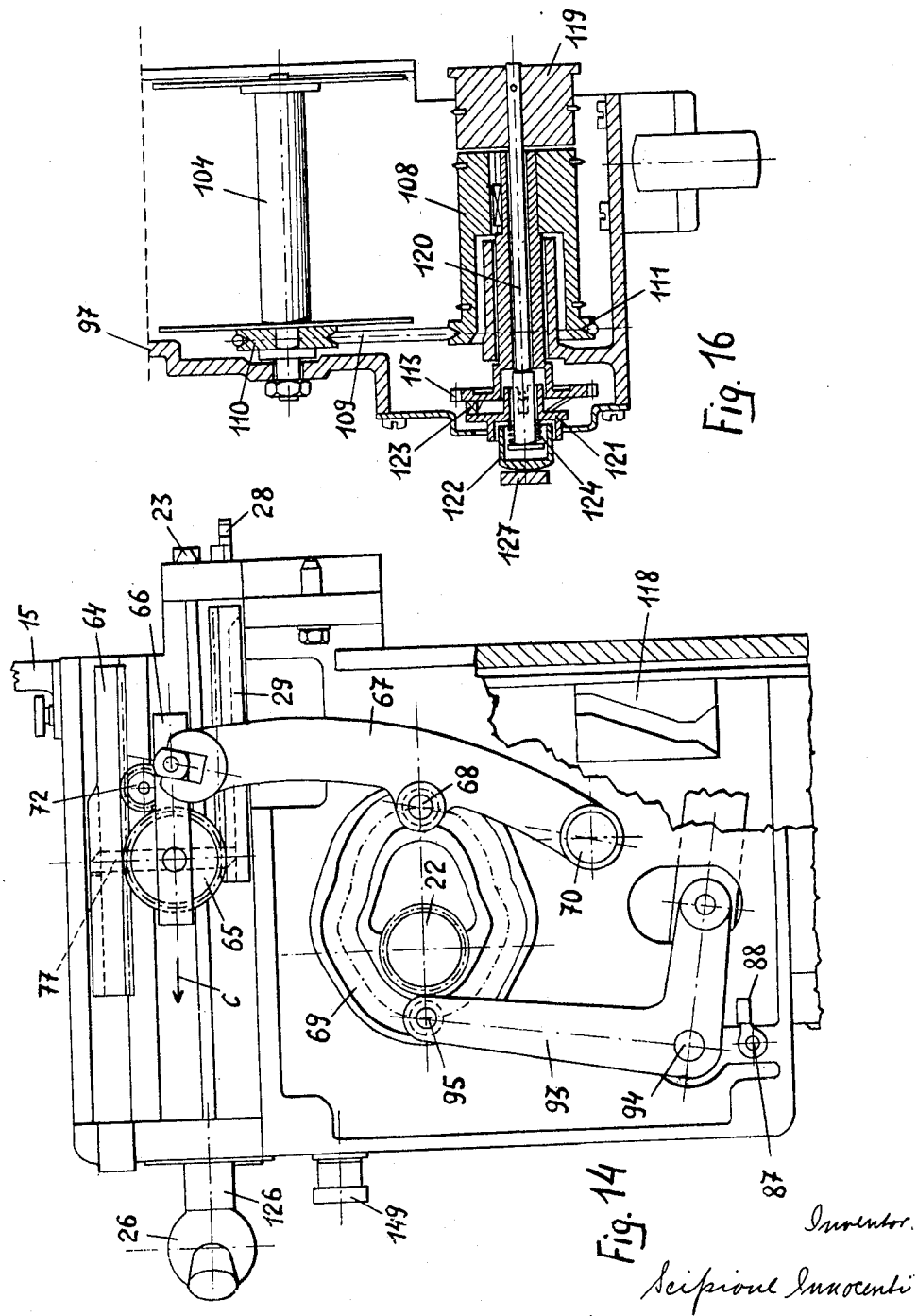

Jan. 17, 1956 S. INNOCENTI 2,731,205
AUTOMATIC TICKET PRINTING AND ACCOUNTING MACHINE
Filed July 27, 1953 9 Sheets-Sheet 9

Inventor:
Scipione Innocenti
by Singer, Stern & Carlberg
Attorneys

United States Patent Office 2,731,205
Patented Jan. 17, 1956

2,731,205

AUTOMATIC TICKET PRINTING AND ACCOUNTING MACHINE

Scipione Innocenti, Bologna, Italy

Application July 27, 1953, Serial No. 370,526

Claims priority, application Italy August 5, 1952

22 Claims. (Cl. 235—101)

This invention relates to automatic ticket-printing machines and particularly to machines for printing railways tickets and accounting the corresponding prices thereof.

Such machines usually comprise a magazine containing a number of matrix plates bearing the necessary printing types and a member (code key) having a conventional shape corresponding to the price of the ticket and adapted to control the accounting devices. For each station and for each class of ticket a single matrix plate is provided in the magazine.

Such machines are further provided with a movable printing and accounting carriage which may be locked on the matrix magazine in correspondence with any of the matrix plates by means of suitable indicating and locking devices. Such carriage automatically and temporarily extracts from the magazine the desired matrix by means of a suitable extracting device, subsequently prints the ticket by means of a suitable printing device upon a suitable sheet of paper or card and provides at the same time for the accounting and/or recording of the prices of the tickets by means of suitable accounting and controlling devices. These are usually constituted by a printing ticket price-adding group, by a visual and/or printing numerator for the progressive numbers of the tickets issued by the machine, an accounting control device for recording on a continuous tape the identifying features and the prices of the issued tickets and furthermore a number of statistical counters which record the number of tickets issued for any desired destination.

For such machines in general, and particularly for the machines having a plane magazine for the matrix plates which is fixed and preferably vertical, the invention embodies a particular printing and accounting carriage characterized by a small carriage arranged within the same and carrying the inking rollers, a ticket-carrying plate and a ticket prices-adding group. This small carriage is shiftable with respect to the matrix plate introduced into the printing carriage while it executes, during the printing cycle of the ticket, a reciprocating movement with regards to said matrix plate in a plane that is parallel to the printing surface thereof. By this movement the small carriage inks the matrix, shifts its ticket-carrying plate momentarily in correspondence or operative relation to the printing surface of the matrix (between this latter and the printing press) and causes the adding-device control members to bear against a particular price-setting code member (key) fastened to each matrix plate.

The mechanisms causing the introduction of each matrix into the printing carriage and its replacement for re-filing into the station therefor in said magazine, as well as the shifting of said ticket-carrying carriage may be of any suitable construction and suitably combined and synchronised.

According to a preferred embodiment of the invention, such mechanisms are actuated by a differential device working in a predetermined plane and comprising a pair of parallelly shiftable racks (which will be referred as "planet racks") co-acting with a gear inserted between them and having a movement of alternate translation and arranged between them in such a manner that one of the racks promotes the extraction of the matrix from the magazine and sets same into printing position into the carriage, while the other rack shifts subsequently the beforementioned ticket-carrying carriage, preferably through a cam.

The movement of the gear controlling the planet racks of the said differential-controlling device is taken preferably from a main grooved control cam through a swinging lever arm.

From the same main cam, which accomplishes a complete revolution for each printing cycle, the reciprocating movement of the stamping device is taken by means of a second swinging lever shifted by 180.° with regards to the first lever.

The advantages of the invention consist in a great simplification of the printing carriage and of the control of the accounting (adding) devices which are mounted on the small movable ticket-bearing carriage. Thus the construction of the whole device is much simpler and cheaper to produce than that found in existing machines for the same purpose.

Also the invention provides for the construction of a railway and like tickets-printing machine, in which the said printing carriage is movably mounted along a straight guide on a board on which the names of the stations are inscribed (station board), this latter being fitted on the open face of a plane fixed magazine (which may be horizontal or inclined but preferably vertical) and being movable with respect thereto in a transverse direction and preferably in a direction at right angles to the movement of the printing carriage. On this board, the names of the stations are inscribed in an order corresponding to that in which the matrices are filed or arranged in the magazine. The setting of the printing carriage in correspondence to the desired matrix plate is effected by means of a pair of shiftable indices which cross themselves on the board, one of said indices being carried by the printing carriage and being movable therewith while the other index is fastened to the matrix magazine.

The above and other features of the invention will be apparent from the following description of a ticket-printing machine embodying the invention and shown by way of non-limiting example in the attached drawings in which:

Figure 5 shows partly in plan and partly in section a portion of the carriage mechanisms.

Figure 6 is a transverse section through the carriage, on line VI—VI of Figure 5.

Figure 7 is a longitudinal section of the printing carriage.

Figures 8 and 9 are two transverse sections through parts of the carriage, on lines VIII—VIII and IX—IX of Fig. 7, respectively.

Figures 10 and 11 show diagrammatically, with parts in section, the operation of the matrix plates-hooking device.

Figure 12 is a cross sectional view through parts of the carriage on line XII—XII of Figure 7.

Figure 13 is another cross sectional view through parts of the carriage on line XIII—XIII of Figure 12, with the accounting record box shown in plan fitted on the stamping press.

Figure 14 shows in elevation the main carriage mechanism-driving means.

Figures 16 and 17 show in side view, and in section respectively, the paper tape-driving mechanisms in the recording box.

Figure 1:
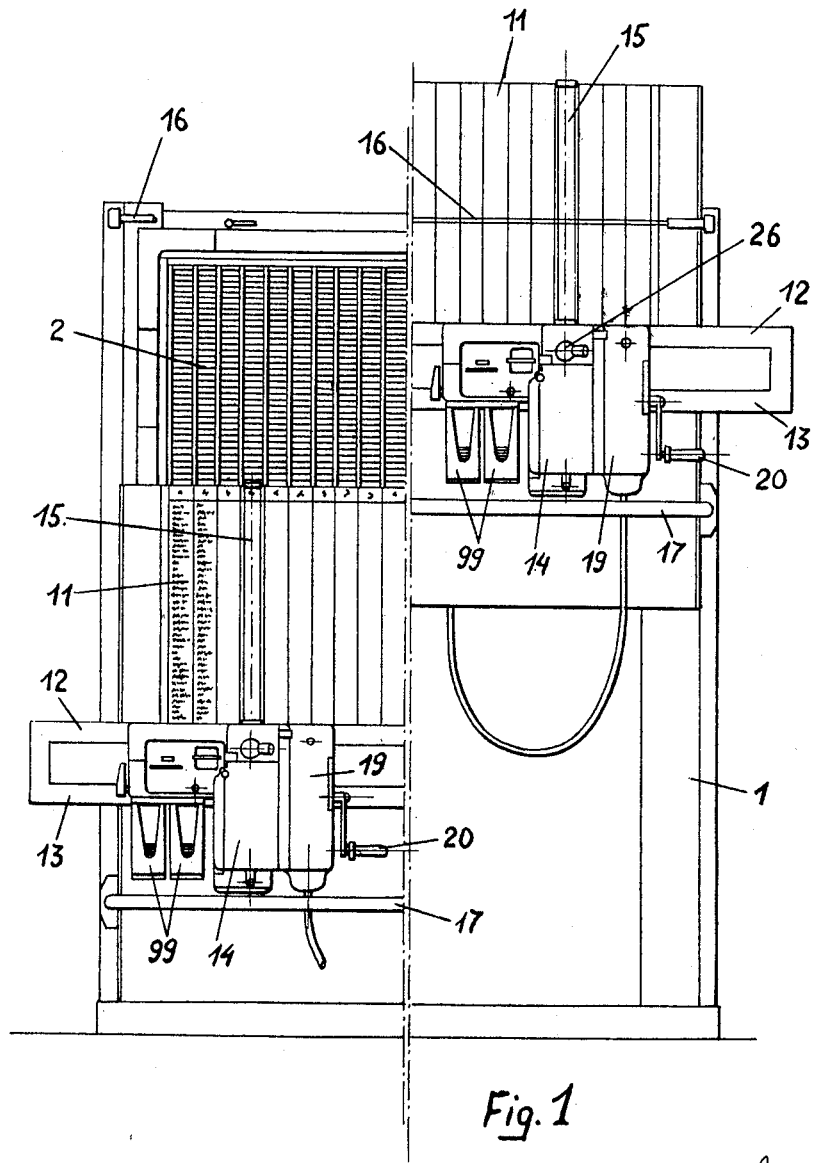
Figure 1 is a front elevational view of an embodiment of the ticket-printing and accounting machine according to the invention, the right-hand half being shown in one working or operative position, while the left-hand half shows the matrix magazine uncovered, due to the lowering of the station board of the machine.
Figure 2:
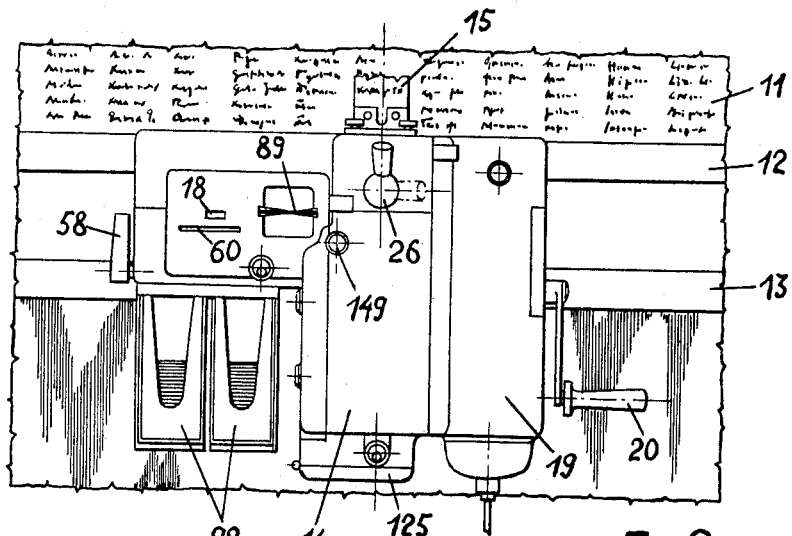
Figure 2 is a front elevational view of the printing carriage and certain associated parts, on a scale enlarged over that of Fig. 1.
Figure 3:
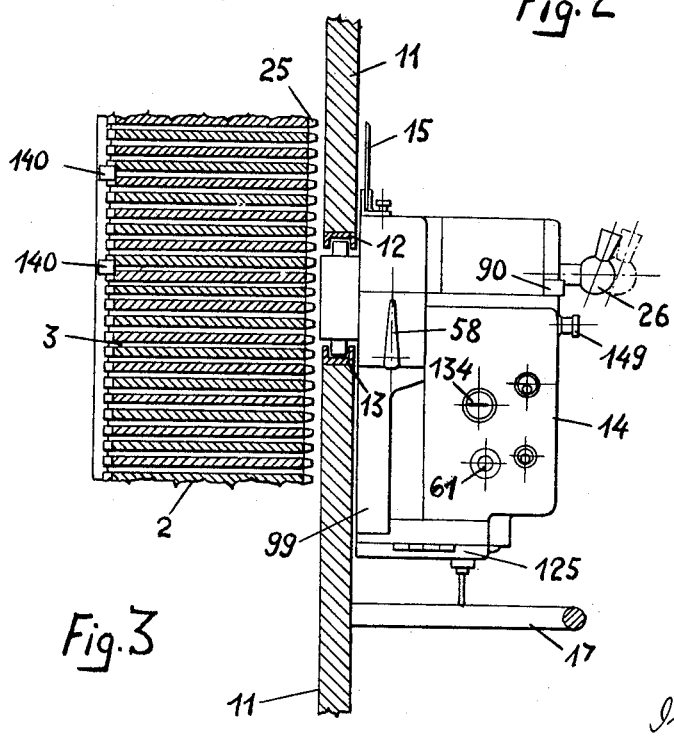
Figure 3 is a side view of the printing carriage on the scale of Fig. 2 with parts of the matrix magazine shown diagrammatically in section.
Figure 18:
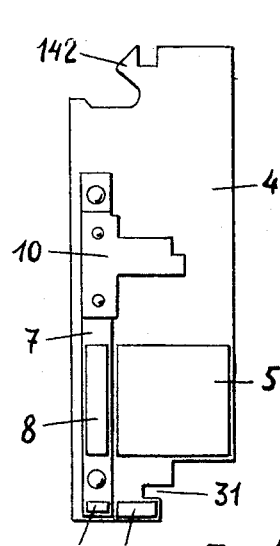
Figure 18 is a view of the printing side of a matrix plate employed in the machine.

Referring particularly to Figures 1 through 3, 1 shows the machine framework carrying the fixed vertical magazine 2 for the matrix plates. These latter are slidably filed within the horizontal casings or station 3 in said magazine (Figures 3, 5, 10, 11 and 12) which are open at their front ends. Said stations are arranged in a plurality of side by side vertical columns and horizontal rows and may be taken out from or removed through the uncovered front of magazine 2 as shown in the left-hand half of Fig. 1 and likewise replaced. Each station receives a single matrix 4 (Figures 4, 10, 11 and 18) constituted by a plate and on the printing lower face of which are fastened a ticket-printing plate 5 and a printing block 6 for the printing on a recording tape later mentioned the identification marks of each ticket. Furthermore on the same face of the matrix plate 4 a changeable plate 7 is fastened carrying the types 8 and 9 for the printing of the price of the ticket both on the ticket and on the control tape and in addition a code key member having a geometrical shape which corresponds to said price and serves for setting the adding device. Said code key member is constituted by a stepped projection 10 (Fig. 18) adapted to come into engagement with the adding device-controlling members, as will be seen hereinafter.

On the front face of magazine 2 a station board 11 is mounted for vertical guided movement and is suitably counterweighted. On this board the names of the stations are inscribed in vertical columns and horizontal lines in an order which corresponds to the arrangement which the corresponding matrix plates 4 have in the magazine 2. However this arrangement is in a reversed order in vertical direction and in a corresponding order in horizontal direction (Figures 1, 2 and 3). On board 11 two horizontal parallel guides 12 and 13 are fastened and between them there is mounted a horizontally shiftable printing and accounting carriage 14. To carriage 14 the vertical index 15 is fastened which is shiftable therewith on board 11 and is constituted for example by a transparent ruler in which two parallel longitudinal lines are drawn. To the framework 1 of the machine there is also mounted a horizontal index 16 arranged in front of and movable with said board 11 and constructed like the vertical index 15.

In order to proceed to the printing of a desired ticket, viz., when the extracting device of the printing carriage 14 is to be set in correspondence with the desired matrix 4 in the magazine 2, the operator shifts the printing carriage 14 horizontally along the guides 12 and 13 and shifts the whole station board 11 vertically on framework 1 by acting on front handle 17, until the name of the desired station, for which the ticket is desired, comes into correspondence or register with the crossing or intersection of the two indices 15 and 16.

The station board 11 is so dimensioned and arranged as to normally intercept in any working position, the whole open front of magazine 2. The vertical movement of said board 11 is limited within the bounds that are necessary for permitting the extraction or removal of any of the selected matrix plates 4. Shifting beyond these bounds is hindered by locks (not shown). In order to have access to the matrix plates contained within the stations 3 of said magazine 2, viz., in order to dismount the board 11, it is necessary to unlock said locks and shift down board 11 below a predetermined limit (as shown in the left-hand side of Figure 1), or also to shift said board upwardly out of its guides on the framework 1.

Like arrangements are provided for the dismounting of the printing carriage 14, which is done preferably in completely lowered position of board 11.

The above described embodiment of machine is adapted for any matrix magazine whether the same be disposed in a vertical, horizontal or even an inclined plane. The shifting of the station board 11 and the printing carriage 14 respectively may take place along any two axes arranged either at right angles (as shown) or inclined.

For all these types of machine, as well for those having the magazine for the matrix plates either plane and movable or also drum-like and rotatable, the invention provides a particular printing carriage, a preferred embodiment of which is shown in Figures 4 through 14.

Printing carriage 14 embodies the following automatic means: a device for locking the carriage 14 to matrix magazine 2, a device for the hooking and taking out or removing any desired matrix from the magazine 2, and inserting same into carriage 14, a device for the introduction, the printing and the expulsion or delivery of the ticket in the order mentioned, a device for adding the prices of the issued tickets, a recording device for the control of the accounting data, a visual and/or printing numerator for setting the progressive numbers of the tickets and for the printing of said numbers on the tickets and on the accounting control tape, a motor-driven device for the driving of the carriage mechanisms and various safety devices which lock the carriage mechanisms, if any of the conditions of regular operation has not taken place.

In the specification and drawings the printing numerators for printing the progressive numbers on the tickets have been omitted, as the construction and operation of such devices is known and these devices are controlled by any member having a periodical movement corresponding to a printing cycle. The visual detection of the progressive numbers takes place through a front window 18 of carriage 14 (Figure 2).

The detailed description of the motor-driving group for the carriage has been also omitted and has been diagrammatically indicated by the box 19 (Figures 1, 2, 5 and 7) and comprises an electric motor, an outer freewheel crank 20 for the manual operation and, in addition, the reduction gear and the gear for transmitting the motor drive. This group indicated generally by the reference numeral 19, may be constructed in any suitable manner and drives through gear 22 on the main shaft 21 of the carriage only in one direction (Figures 4, 7, 13 and 14).

The device for the locking of the printing carriage 14 in the desired position on and to the matrix magazine 2 comprises a block 23 (Figures 4, 5, 12 and 14) carried by rod 24, slidably guided for movement in a direction at right angles to the plane of the front of the magazine 2. The block 23 projects in part beyond the rear face of carriage 4 and is adapted to come into mesh with the pyramidal teeth 25 provided on the front face of said magazine 2 (Figures 3, 10 and 11). Rod 24 is rotatably connected to outer handle 26 which is rotatably and slidably mounted with regards to the framework 27 of the printing carriage. By pushing handle 26 inwardly (see the two positions shown in Figure 3) block 23 comes into mesh (Figures 5 and 12) (Figure 4) of teeth 25 with certain magazine 2, thus effecting the locking of the carriage to the magazine 2. By pulling handle 26 outwardly the unlocking of carriage 14 is effected by withdrawing said block from said certain teeth.

The device for the hooking and withdrawing of any selected matrix 4 from the magazine is controlled by the same handle 26 and comprises a hook 28 (Figures 4, 5, 7, 10, 11 and 12), which is fulcrumed to an extension 30 of rack 29 and is adapted to engage a front notch 31 in the matrix plane 4 (Figures 10, 11, 12 and 18) when said hook is swung in one direction on the extension 30. The swinging hook 28 presents at its upper part, a groove 36 that opens towards the magazine 2 and in which groove usually the pivot pin 32 on one arm of a bell-crank lever 33 is engaged. Said lever pivotally attached to rod 24 and is linked or connected at its other arm, by means of small rod 34, to a sleeve 35 which is slidably but not rotatably mounted on rod 24 (Figures 4, 5, 10, 11 and 12). Sleeve 35 is connected to handle 26, for example by means of an arm 135 engaged in a helical groove 136 in the hub 126 of said handle 26 (Figure 4) or by some other equivalent means, for example by means of a steep-pitched screw nut extension 235 screwed on the screw-threaded end of hub 126 of handle 26 (Figures 5, 10, 11 and 12). The whole is so arranged as to promote by the rotation of handle 26 (see the two positions shown in Figure 2) the axial shifting of bell-crank lever 33. In the hub 126 is a slot or groove 37 having a branch extending axially and a branch circumferentially of said hub and in which the pin 38 fastened to the framework 27 of the printing carriage (Figures 4, 10, 11 and 12) is engaged.

Figure 4:
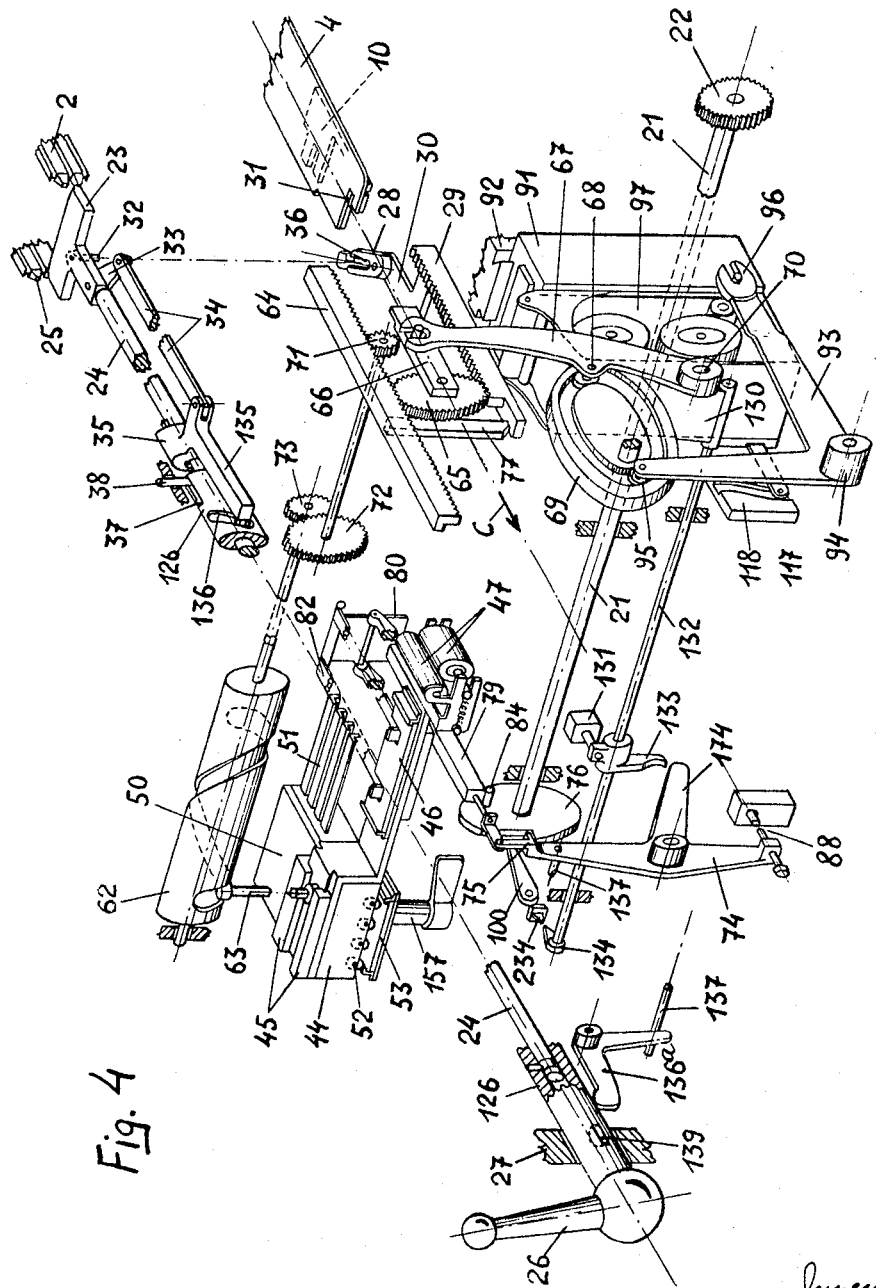
Figure 4 is an exploded perspective view of the printing carriage.

The operation of the above device is as follows:

In the rest position of the device (Figure 4) viz. when carriage 14 is not locked to magazine 2, handle 26 is disposed in its outer position (shown by dotted lines in Figure 3) and cannot be turned as pin 38 is engaged in the axial directed branch of groove 37. When sleeve 35 is in its pushed in or advanced position towards magazine 2, holding hook 28 is retracted as shown in Figure 4. By pushing handle 26 towards magazine 2 (position shown by full lines in Figures 2 and 3) carriage 14 is locked to the magazine 2 by the entrance of the block 23 between the teeth 25. However at this time said hook 28 does not substantially vary its angular position as the mechanism, comprising the parts 32, 33, 34, 35 and 126, effects a slight axial translation or turning movement (see Figs. 10 and 11). Fixed pin 38 then registers with the circumferential branch of groove 37 and thus renders the rotation of handle 26 possible. In order to hook onto a matrix plate, the handle 26 is turned by about 90° (see position shown in Figure 11 and position shown by dotted lines in Figure 2) thus promoting, due to the helical groove 126 (or due to the connection by means of screw 235) the axial withdrawing of sleeve 35 and the forward swinging of the free arm 32 of bell-crank lever 33 (Figure 11). Pin 32 then causes hook 28 to swing forwards to the right in Fig. 10, thus setting same with the straight section of its groove 36 in the direction of the extraction of matrix plate 4 and at the same time engaging same into the holding notch 31 of said matrix plate (Figures 11, 5 and 12). Thus matrix 4 is hooked to the extracting device which, in the case as shown, is constituted by rack 29, and can be extracted from its station 3 and introduced into the printing device of carriage 14. During this translation or movement of matrix plate 4; hook 28 remains in its hooked position (Figure 11), as it is guided by guides 39 of the carriage framework 27, so that pin 32 comes freely out of the open end of groove 36. For the same reason, when the printing cycle is completed and during the refiling or return of the matrix plate into its associated station 3, pin 32 comes again into groove 36 of hook 28 and the operation of the parts for the hooking of the matrix and the unlocking of the carriage take place in reverse direction.

The position of "locked carriage" and "hooked matrix" of handle 26 is necessary for the operation of the remaining mechanisms of the printing carriage, as will be better seen hereinafter.

It is further to be noted that each matrix 4 is usually but detachably connected to a part of the magazine 2 by means of a rocking lever 41 (Figures 10 and 11) fulcrumed on the rear or non-printing face of said matrix. One of the arms of lever 41 is provided with a hook 241 which normally, under the action of spring 42, engages a projection 103 of matrix magazine 2 while its other arm 341 overlies the holding notch 31 of the selected matrix 4 (Figure 10). By its hooking movement, hook 28, as it swings into the position in Fig. 11, abuts against arm 341 and causes lever 41 to swing, thus disengaging the opposite arm 241 thereof from projection 103 (Figure 11). The matrix can then be freely taken out or withdrawn from its station. In the replacement or refiling of the matrix in its station, the hook 28 is disconnected from the matrix and lever arm 41 is again connected to projection 103 in a reversed manner to that described and by action of spring 42.

When carriage 14 has been locked in its desired position and the corresponding matrix plate 4 has been hooked by the extracting device 28—29, a ticket card 43 (see Fig. 6) to be printed is introduced into carriage 14.

The mechanism for the introduction and the automatic expulsion or rejection of the printed ticket is one of the main features of the machine and carriage according to the invention and comprises the small carriage 44 horizontally shiftable in suitable guides 45 in a direction at right angles to the direction of movement of the matrix plate 4 (Figures 4, 5, 6, 7 and 8). This small carriage 44 carries a small plate 46 provided with a pad made of hard rubber or the like and which is movably mounted and guided thereon in a direction at right angles to the printing plane of the matrix plate and adapted to take or receive between suitable lateral guides the ticket 43 to be printed (Figures 6 and 7). Before plate 46, in the direction of forward movement of small carriage 44 towards matrix plate 4, there are mounted one or more inking rollers 47 which may come into elastic contact with the printing types 5, 6, 8 and 9 of matrix plate 4 fitted on printing carriage (Figures 4, 5, 7 and 9). Movable inking rollers 47 are inked from inking roll 48 (Figures 7 and 9) which is mounted upon a part of the framework 27 of the printing carriage by means of supporting rod 49 which may be extracted by manipulation of its outer end 149. Said carriage 44 carries furthermore an adding device 50 (Fig. 4) which prints the sum of the prices of the issued tickets and whose controlling and locking racks 51 directed in the direction of movement of carriage 44 may abut against key 10 of matrix plate 4 when this is set into the printing carriage (Figures 4 and 6).

In the rest position of said carriage 44, as shown in the figures, the adding device 50 moves with its printing drums 52 (Figures 4, 7 and 8) into operative relation to a plate 53 which is adapted to receive between suitable side guides a control slip 57 and is hinged to framework 27 of printing carriage by means of toggle levers 54 and 55 normally pulled downwardly by spring 56 (Fig. 8). Plate 53 is adapted to be pressed against the printing drums 52 of adding device 50 by some suitable control means as for example by rotating the lower steep-pitch pressure screw 157 (Fig. 4) or by means of side pressure lever 58 fastened to shaft 59 of lever 55 (Figures 2, 3, 7 and 8). The accounting figures appear on the control slip 57 set on plate 53 through front slot 60 of printing carriage 4 (Figures 2 and 8).

The operation of the carriage 44 is effected by a helical groove in a cam 62 in which is engaged a pin 63 (Figures 4 and 8), extending upwardly from a part of said carriage. The movement of cam 62 and carriage 44 is suitably synchronised with the extracting and the returning or refiling of matrix plates 4 by means of a plane differential gear of known construction and comprising a pair of parallel racks 29 and 64 (Figures 4, 7 and 14). Said racks are slidably mounted for movement in the direction of movement of matrix 4 and mesh with the gear 65 arranged between them. This gear 65 is idly mounted or journalled on slide 66 which slides parallelly to racks 29 and 64, reciprocated with a straight movement by swinging lever 67 fulcrumed at 70 and engaging by its roller 68 cam groove 69 on main shaft 21 (Figures 4, 5, 7, 13 and 14). Helical cam 62 is driven by upper rack 64 through gear drive 71, 72 and 73 (Figures 4, 7 and 14) while lower rack 29 constitutes the matrix plate-extracting mechanism and carries, as said, the holding hook 28.

The ticket-carrying carriage 44 is coupled with an automatic starting device which starts the mechanisms of the printing carriage when the card 43 to be printed is fitted in its right position on plate 46. This device is constituted by lever 74 (Figures 4 and 9) co-acting by means of its tooth 75 with a disk 76 keyed on main shaft 21 and provided with a notch 177 in which said tooth may be engaged (Figure 9). Lever 74 is operatively connected to rod 78 (Fig. 9) slidably guided within the tubular extension 179 of a co-axial telescoping rod 79 hinged to balance lever 80 fulcrumed on framework 27 of the printing carriage (Figures 4, 6 and 9). The other arm of lever 74 controls either directly (Fig. 4) or through pulling member 85, swinging lever 86 and shaft 87 (Figures 7, 9 and 14), the switch 88 of the electric motor which drives the printing carriage and is enclosed in the box 19 thereon.

Within the tubular extension 179 a helical spring 81 is compressed between fixed parts of said tubular extension 179 and small rod 78 in such a manner as to render the system 79—78 either rigid due to the axial push on rod 79 in the direction of arrow A, or elastically extensible due to an axial push on the same rod 79 in the direction of arrow B, as will be better seen hereinafter. On disk 76 an eccentric pin 84 is fastened and which is adapted to abut against the end of the tubular extension 179. On the upper arm of balance lever 80 there is hinged fork 82 (Figures 4, 5 and 6), the substantially horizontal arms of which are transversally shiftable in the direction of movement of the carriage 44 in transverse seats 83 of the ticket-carrying plate 46. Said arms have shaped ends, for example ends bent upwardly, so as to abut against and limit movement of said card 43 at the end of its setting into or arrangement on said plate 46.

The printing device proper of carriage 14 comprises a stamping member 91 (Figures 4, 12 and 13) which is shiftable either vertically or otherwise at right angles to the printing plane of the matrix between suitable guides 92 on a part of framework 27 of the printing carriage, in correspondence of the types of said matrix plate. The shifting of the stamping member 91 is controlled by main cam 69 through bell-crank lever 93 (Figures 4, 9, 12 and 14), fulcrumed at 94. This lever 93 engages roller 95 in the groove of cam 69 and is shifted by about 180° with regards to lever 67, while its other arm is hinged at 96 to pressure or stamping member 91. On the movable stamping member 91, a box 97 is fitted which will be described hereinafter and which contains the device for recording the accounting numbers on the continuous tape.

The operation of the above described devices are as follows:

In the rest position all the parts are disposed as illustrated in the drawings. Lever 74 is engaged in notch 177 of disk 76, thus locking main shaft 21 and keeping switch 88 opened. The rod 78 bears against the end of rod 79 and the arms of fork 82 are inserted in the seats 83 of the ticket-carrying plate 46. The carriage 44 is fitted sidewise with respect to the matrix plate to be extracted and lever 67 keeps gear 65, and with it the planet racks 29 and 64, in their position of maximum forward shift towards matrix magazine 2.

The ticket 43 to be printed, taken from the outer ticket magazine 99, is set on plate 46 through front slit 89 (Figures 2, 5 and 6) and, when it is pushed completely through said slit comes into contact with the arms of fork 82 and pushes same out of their seats 83. This movement promotes the oscillation of balance lever 80 and through rigid rod system 78—79 promotes the oscillation of lever 74. Tooth 75 of this latter is disengaged from notch 177 of disk 76 thus freeing main shaft 21 while at the same time the opposite arm of lever 74 closes motor switch 88. In this manner the printing cycle of the ticket 43 takes place, and is completed during a single revolution of shaft 21. During this revolution, lever 74 by its tooth 75 bears on disk 76 thus keeping switch 88 closed and fork 82 retracted out of the path of carriage 44.

Figure 15:
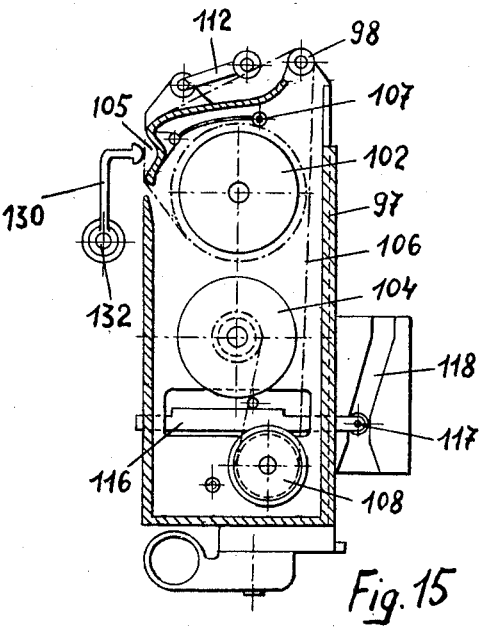
Figure 15 shows in section the account recording box.

In the first quarter or revolution of cam 69, lever 67 is actuated and shifts slide 66 and gear 65 in the direction of arrow C (Figures 4 and 14). The two planet racks 29 and 64 are connected between them by the vertical prismatic rod 77 ending with planes so inclined as to automatically lock either of racks, according to their respective position and direction of movement. The parts are so arranged that in the first parts of the shift of rack 29, said rack takes out of magazine 2 the matrix which has been engaged by the hook 28 and moves or sets same in printing position into carriage 14, while subsequently rack 64 is shifted, and this through step-up transmission 71, 72 and 73 drives helical cam 62. Carriage 44 is then shifted transversely towards the matrix plate and through the inking rollers 47 first inks all types 5, 6, 8 and 9 thereof and shifts to the end of the stroke the ticket-carrying plate 46 together with the card 43 in correspondence with the types 5 and 8 of the matrix plate and of the fixed date stamp 90 (Figures 5, 7 and 9). This latter is encased so that it can be easily extracted in the framework 27 of carriage 14 and is inked by elastic contact with the same rollers 47 of carriage 44. The types 6 and 9 of matrix plate 4 which are designed for accounting records, project beyond plate 46 and move to above roller 98 of box 97 on which the recording tape 106 passes (Figures 12, 13 and 15). By the forward movement of carriage 44, the locking racks 51 of the adding device 50 abut against the stepped projection or key 10 of said matrix plate and are correspondingly shifted axially and thus drive the adding rollers.

During the said first phase of rotation (by about 90°) of cam 69 lever 93 has remained fixed because it has been engaged in a concentric section of said cam 69. During the successive quarter of revolution of shaft 21, it is lever 67 that enters said concentrical section of cam 69, thus keeping matrix plate 4 and carriage 44 in printing position, while lever 93, which shifts pressure member 91 towards the matrix plate 4, is swung, thus pressing both roller 98 of the recording box 97 and movable plate 46, which carries the card 43 on which the matrix types are to be printed.

By the second half turn of cam 69, all members accomplish in reverse succession the movements in opposite direction with regards to those described, thus bringing said members back to rest position. Shortly before accomplishing a complete revolution pin 84 on, disk 76, abuts against the tubular extension 179 of rod 79 and shifts the latter to its rest position, and causes the automatic expulsion or ejection, through slit 89, of the printed ticket 43. This is effected by the action of fork 82 which returns in the casings 83 of the ticket-supporting plate 46, which, in the meantime, has been brought back into rest position. By the same movement of rod 79—179 spring 81 is compressed and subsequently causes lever 74 to snap into notch 177 of disk 76, thus locking main shaft 21 and simultaneously stopping the motor by opening switch 88.

A small auxiliary lever 100 (Figures 4 and 9) locks lever 74 into starting position. This lever is automatically unlocked when, after a complete revolution of the disk 76 and wherein, it rides on the outer periphery of said disk 76. The return of the locking racks 51 of the adding device 50 to their aligned position is obtained by causing same to abut, at the end of their stroke, against a fixed bearing 101 (Fig. 5).

Figure 17:
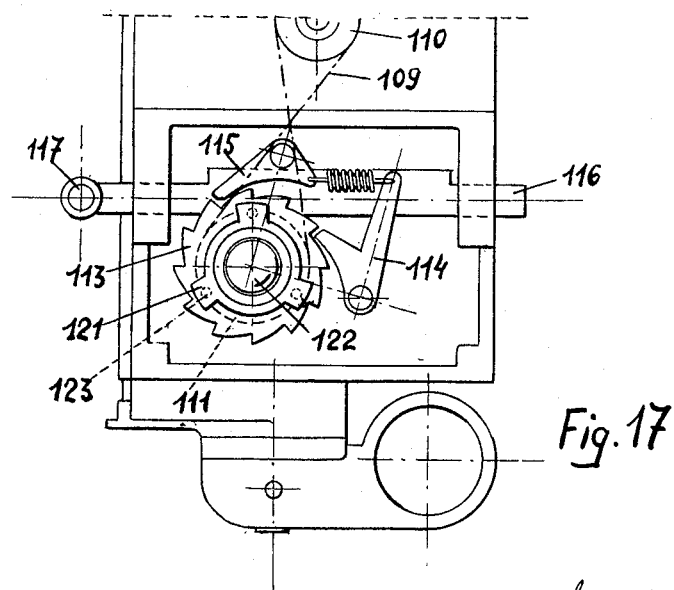

As before mentioned, the recording control device which prints on a continuous tape the prices and the particulars of the issued tickets comprises a dismountable box 97 containing the two drums 102 and 104 (Fig. 15). The paper tape 106 shown in dotted lines in Figure 15, is unwound from feed roll 102 and by co-operating with brake 107 merges to the exterior above hollow 105 of box 97 and subsequently above supporting roller 98 for the printing and above the pin pulling drum 108—119 and finally is wound upon drum 104. This latter drum is driven by said drum 108 through belt 109 and a pair of small pulleys 110 and 111 (Figures 15, 16 and 17). An idle spring tensioning roller 112 (Figures 13 and 15) keeps tape 106 tensioned on supporting roller 98. The feed of tape 106 takes place through the intermittent rotation by constant angles of the pin drum 108. This is driven through pawl-and-ratchet drive 113, 114 and 115 (Figure 17) and the reciprocating rod 116, which with its roller 117 engages the grooved flat cam 118 fastened to framework 27 of the printing carriage (Figures 13, 14, 15 and 17). Tape 106 advances by one step at each up and down movement of box 97 together with the stamping member 91. Co-axially with pulling drum 108, rotatably coupled to ratchet 113 of pawl mechanism (Fig. 16) an idle drum 119 is provided with dragging pins, which drum is engaged with the paper tape 106. Roller 119 carries shiftable but not rotatable, on its shaft 120, a plate 121 provided with peripheral ears and with a knob 122 which projects out of the box 97 (Figures 16 and 17). Plate 121 abuts normally with its ears against an equal number of projections 123 of the ratchet wheel 113 and is urged towards this latter by spring 124. When box 97 is mounted within the printing carriage 14 through lower door 125, knob 122 is urged against lever arm 127, which is elastically urged through lever 128 and spring 129 towards starting lever 74, and can lock this latter in the locking position of disk 76 (Figures 9, 13 and 16).

The above described mechanism constitutes a safety device preventing the operation of the printing carriage when the recording tape 106 does not advance regularly, for example due to a fortuitous sticking of the paper layers of the feed roller 102. The operation of the just described device is as follows:

During the regular feed of tape 106, idle drum 119 is pulled by the tape at the same rate as feed drum 108, so that the plate 121 provided with ears rests upon pins 123 thus keeping knob 122 in its outer position. This in its turn pushes and keeps lever 127 out of the path of lever 74, which can be freely shifted. If for any reason the feed of paper tape 106 stops, drum 108 keeps on rotating, as it is positively driven, and peripherically tears by its pins the tape 106, while idle drum 119 remains still. Therefore the plate wings 121 will be shifted with regards to the corresponding pins 123 of ratchet wheel 113 and plate 121, being unsupported, will snap inwardly on wheel 113 by action of spring 124, thus withdrawing knob 122. Lever 127 being no longer backed, spring 129 will urge same so as to lock starting lever 74 in opening position of switch 88. These conditions are indicated outside by index 61 driven and/or carried by said lever 127 (Figs. 3 and 7).

Besides the described device, other safety devices are also provided which, in the embodiment as shown act all for the mechanical locking of starting lever 74.

The safety device, in the case of absence or of tearing of the recording tape 106, is constituted by feeler lever 130 (Figures 4, 12 and 15) bearing on tape 106 in correspondence of hollow 105 of box 97 and is urged in this direction by adjustable counterweight 131. On the same shaft 132 of feeler 130 and counterweight 131 a lever 133 is fastened (Figures 4 and 9) which can engage the nose 174 of lever 74. When the tape 106 is in place and has the right tension, lever 133 keeps starting lever 74 free (Figures 4 and 9). An index 134 (Figures 3,4, 7 and 9) shows this condition from the outside of the carriage 14. When tape 106 is missing, due to exhaustion or tearing, feeler 130 falls into hollow 105 and lever 133 locks lever 74 while the index 134 shifts itself together with shaft 132 with respect to a fixed reference 234 (Figure 4) and informs that the machine is stopped due to an irregularity in the recording tape.

A further safety device which locks the parts of the printing carriage 14, in the case of absence of locking of said carriage to the matrix magazine, as well as of the absence of hooking of the matrix plate to be taken out, is connected to handle 26 and comprises bell-crank lever 136ª (Figures 4 and 12) which normally locks by one of its arms the lever 74 by acting on pin 137 thereof by action of spring 138, while its other arm rests on hub 126 of handle 26 and can penetrate into notch 139 of said hub 126. When the printing carriage is to be locked on magazine 2 and the desired matrix plate is to be hooked, the handle 26 is shifted back and turned by about 90°, as described and then notch 139 comes into correspondence or register with the corresponding arm of lever 136. This can then freely swing, by introducing itself into notch 139 and permitting the starting swinging of lever 74. By the same shifting, lever 136 locks handle 26 and therefore locks printing carriage 14 on magazine 2 for the whole ticketing-printing cycle, as it is pushed and locked into notch 139 by pin 137 against the pulling of spring 138. This latter brings lever 136 back to its rest position, in which it frees handle 26 only after lever 74 has come back to its locking position.

A further safety device preventing the operation of the printing mechanisms in case of absence or of irregular introduction of the card to be printed consists in the same starting device which is controlled by the introduction of the same card into the printing carriage.

It is further to be noted that the statistical counters 140 (Figures 2, 10 and 11) which record the number of tickets issued for each station are fastened to matrix magazine 2 in correspondence of each station 3 and are controlled in any suitable manner by the extraction and refiling or returning of the same matrix plate. This may be accomplished, for example, by means of a bell-crank lever 141 fulcrumed to counter 140 and co-acting with a cam part 142 of the matrix plate (see also Figure 18).

It is apparent from the foregoing description that the carriage 44 is manually shiftable both vertically and horizontally relative to the front of the machine, into a position wherein its matrix engaging mechanism is located in a position that corresponds or registers with the filed position of that matrix, bearing the patron's destination name, in the magazine located to the rear of the station board. This filed position of said matrix, in its station in said magazine is indicated usually by the position of the intersection or crossing of the indices 15 and 16, respectively. After so positioning the carriage, it is locked against movement to the magazine by manipulation of the handle 26 as before described and upon insertion of a ticket card 43 into the slot 89, automatic operation of the mechanism in the carriage is initiated. In the operation of said mechanism, there is printed upon the inserted ticket card, data including its price and the patron's destination, and such data recorded on a tape therefor and then this printed ticket is ejected from the machine for use by the patron.

It is apparent from the foregoing description of the machine that in the operation thereof, the selected matrix is moved in a horizontal plane perpendicular with the face of the station board and magazine, the printing carriage is also moved in a horizontal plane but parallel to the face of said board and magazine, and the ticket stamping and recording mechanism jointly move in a vertical plane parallel with the face of the board and the magazine and at a right angle to the plane of movement of the selected matrix and printing carriage.

Of course the invention is not limited to the embodiment as described and shown but may be amply varied and modified without departing from the basic principles set out in the present specification and resumed by the following claims.

What I claim is:

1. An automatic ticket-printing and accounting machine comprising a fixed frame: a plane magazine mounted on said frame and embodying a plurality of frontally opened stations arranged in horizontal rows and vertical columns, and each of which stations is adapted to removably receive for filing a matrix plate, bearing printing types and code means; an horizontal index arranged on the front of said magazine; a station name board on which the names of the station are arranged in vertical columns and horizontal lines in an order according to that in which the corresponding matrix plates are inserted in said magazine stations, means by which said station board is shiftably mounted for movement in a vertical direction along the front of said magazine rearwardly of said horizontal index; horizontal guide members carried by said station board and a printing carriage slidably mounted along said horizontal guide members and provided with a vertical index projecting thereabove and crossing the said horizontal index in correspondence of the name of the station for which the ticket is to be printed, means operable for locking the printing carriage in correspondence with any of the stations of the matrix plates in the magazine, a matrix-hooking device for extracting of the desired matrix from its station in the magazine and for introducing said extracted matrix into the printing carriage, and for re-filing the matrix into the said magazine all of said last-named operations taking place in planes at right angles to the plane of the matrix magazine, a device for the introduction of the ticket to be printed into the printing carriage by shifting the same horizontally and parallel with the plane of the station board and for its adjustment in correspondence of the matrix plate extracted from the magazine and introduced into the printing carriage, vertically shiftable means for pressing the ticket to be printed against the matrix plate, a device for the ejection of the printed ticket from the printing carriage, means for printing data relating to the issued tickets on a continuous control tape, means for driving the printing carriage mechanisms, and means controlled by the said ticket to be printed, when it is introduced into the printing carriage, for starting said printing carriage driving means and for the stopping thereof after the ticket has been printed and ejected from said printing carriage.

2. An automatic ticket-printing and accounting machine according to claim 1, in which the devices for the introduction into the printing carriage of the ticket to be printed, for its adjustment in correspondence of the matrix extracted from the magazine and for its ejection from the printing carriage after its printing, include a ticket carriage, slidably mounted within the said printing carriage: means on said ticket carriage for holding a ticket to be printed, and means for shifting said ticket carriage from a position in front of a ticket-introduction slit of the said printing carriage to a position in correspondence of the matrix plate extracted from the said magazine, and vice-versa.

3. An automatic ticket-printing and accounting machine according to claim 1, in which the device for the introduction of the ticket to be printed into the printing carriage, its adjustment in correspondence of the matrix plate and its ejection after its printing, comprise a ticket carriage, horizontal guides in the said printing carriage for slidably mounting said ticket carriage thereon; means for shifting said ticket carriage in a direction at right angles to the direction of extraction and refiling of the matrix plates from and into the said magazine: a supporting plate mounted in said ticket carriage in guides at right angles to the printing plane of said matrix; said printing carriage having a slit therein for introduction of the ticket to be printed on said plate of the ticket carriage when this plate comes to be in correspondence of said slit; inking rollers mounted on one end of the said ticket carriage in the direction of the position in which the extracted matrix is brought; means for shifting said ticket carriage in correspondence of the position in which the extracted matrix has been brought, whereby the inking rollers are caused to roll on the matrix printing face; means for compressing the said ticket-carrying plate of the ticket carriage against the said matrix plate; means for shifting again said ticket carriage, after the ticket printing, in correspondence of the printing carriage slit and to expel said ticket, after its printing, through the same slit and means, carried by said ticket carriage, adapted to print the sum of the prices of the issued tickets on a control card and a second slit in said printing carriage for introducing said control card, and a movable plate in said printing carriage for holding said control card and means for pressing said plate against said means which print the sum of the prices of the issued tickets.

4. An automatic ticket-printing and accounting machine, according to claim 1, in which the device for automatically starting and stopping the driving devices comprises a two-armed swinging lever fulcrumed to the printing carriage and controlling by means of one of its arms a switch inserted in the circuit of an electric motor for the actuation of said mechanisms of the printing carriage, while its other arm presents a tooth co-acting with a disk provided with a notch and keyed on a driving shaft which effects a revolution at each printing of a ticket; an elastically extensible telescoping rod connecting the tooth-carrying arm of the said swinging lever with a balance lever fulcrumed to the said printing carriage and which maintains the tooth of the swinging lever normally engaged in the notch of said disk, whereby the switch is opened and the motor stopped; a fork hinged to said balance lever, slidably mounted in transversal guides of the ticket-carrying carriage and adapted to abut against the ticket to be printed, when latter is introduced into the said printing carriage and on the plate of said small carriage, said hinged fork being shifted back out of the transversal guides of said small carriage by being pushed by the ticket introduced into said printing carriage, whereby the balance lever is swung so as to angularly shift, through the telescoping rod, the said swinging lever and closing the said switch, whereby the motor is started and the tooth of the swinging lever is pushed out of the notch of said disk, and is caused to slide along the periphery of said notched disk during the rotation of this latter; an abutment pin carried by said notched disk and adapted to abut against the telescoping rod a short time before the end of a complete revolution of the said notched disk, thus causing said rod to extend itself so as to angularly shift the balance lever and whereby the said fork is again pushed into the transversal guides of said ticket carriage, thus promoting the expulsion of the ticket from said ticket carriage by the action of said fork; and spring means fitted within said telescoping rod which are tensioned by the elongation of said rod and are adapted to cause said swinging lever to snap at the end of the printing cycle into engagement with the notch of said notched disk, whereby the switch is opened and the motor stopped.

5. An automatic ticket-printing and accounting machine, according to claim 1, in which the devices for the locking of the printing carriage on the said matrix magazine and for the extraction from this latter of a predetermined matrix plate comprise a control shaft or hub in said printing carriage and arranged perpendicular to the plane of the magazine, slidably and rotatably mounted away from and towards said magazine; an outer control handle attached to said hub and rotatably connected by an axial thrust with a co-axial locking shaft; a locking plate fitted at the end of said locking shaft and adapted to engage itself with a toothed front part of the matrix magazine; a hook swinging on a part of the printing carriage that is slidable towards and away from said magazine; a bell-crank lever fulcrumed on said locking shaft; a pin carried by said bell-crank lever and adapted to angularly shift said hook and engage same with the chosen matrix in the magazine, means for effecting the angular shifting of said bell-crank lever, comprising an arm hinged to said bell-crank lever, a sleeve slidably but non-rotatably mounted on said locking shaft and connected to said arm, a clutching device for connecting said sleeve with the said co-axial control shaft or hub and means for avoiding the rotation of the said control shaft when same is not pushed towards the matrix magazine and consequently when the locking arm is not engaged with the said magazine and also means for avoiding the axial shifting of said control-shaft when same is rotated in such a direction as to cause a matrix to be hooked.

6. An automatic ticket-printing and accounting machine according to claim 1, in which there is provided a device for recording the data of the issued tickets that comprises a box slidably mounted within the printing carriage, perpendicularly to the plane of the matrix, away and towards this latter, in correspondence of the position in which the matrix plate is brought within the printing carriage; a pair of rotatable drums fitted in said box, a continuous paper tape unrolling itself from one of said drums and rolling itself on the other drum, by passing above an outer supporting roller fitted to the end of the box which is turned towards the matrix and parallel to this latter, means for the stepwise advancing of said paper tape comprising two co-axial toothed rollers, on which the paper tape passes and one of which is positively driven while the other is idle and is drawn by the said paper tape, control means shifting the said box towards the matrix plate, when the ticket is being printed, by pressing supporting roller on a part of the matrix bearing the data of the ticket to be recorded, and ratchet control means co-acting with an outer cam, fastened to the printing cariage, and causing the first of said toothed rollers to angularly advance for a certain angle at each shifting of said box.

7. An automatic ticket-printing and accounting machine according to claim 1, in which there is provided a device for the recording of the data of the issued tickets that comprises a box slidably mounted within the printing carriage at right angles to the plane of the matrix and away and towards this latter, two drums mounted in said box, a continuous paper tape unrolling itself from one of said drums and rolling itself on the other drum, by passing over an outer supporting roller on the end of the said box turned towards the matrix plate, means for the stepwise advancing of said paper tape, comprising two co-aixal toothed drums on which the paper tape passes and the first of which is positively driven while the other one is idle and is driven by the said paper tape, means for stepwise angularly shifting the said first toothed drum at each shifting of said box, means sensible to the shifting of said toothed drums with regards to one another and connected to a stopping device locking the printing carriage-starting means when the paper tape is stopped, and a feeler means sensible to the integrity and to the tension of the said paper tape and connected to a stopping device adapted to lock said starting means when the paper tape is missing or is too loose.

8. A ticket-printing and accounting machine according to claim 1, in which automatic stopping means are provided which lock the starting device of the printing carriage when this latter is not locked to the matrix magazine and when no matrix is introduced into the printing carriage.

9. An automatic ticket printing and recording machine according to claim 1, in which the means for driving the mechanism of the printing carriage comprise an electric motor, a step-down gear driven by said motor, a main motor shaft driven by said step-down gear and adapted to effect at each printing cycle a single complete revolution, a slotted cam keyed on said main motor shaft, a swinging arm engaged in said cam and controlling the printing device and the device for recording the data of the issued tickets; and a second swinging arm engaged in said cam and driving through a plane differential gear both the devices for the extraction from the magazine and for the introduction into the carriage of a chosen matrix plate and, through a helical cam, the devices for recording the ticket to be printed in correspondence with the matrix taken out of the magazine.

10. In an automatic ticket-printing and accounting machine comprising a fixed frame, a plane magazine fastened to said frame and composed of a plurality of frontally opened casings arranged in horizontal rows and vertical columns, in each of which casings a matrix plate bearing printing types and code means for controlling the accounting device of the machine are slidably filed, an horizontal index extending along the whole front of said magazine, a station board, on which the names of the station are inscribed in vertical columns and horizontal lines in an order which is conjugated to that according to which the corresponding matrix plates are inserted in the magazine casings, said station board being shiftably mounted in vertical direction along the front surface of said magazine and under said horizontal index, horizontal guide members fastened to said station board and a printing carriage, slidably mounted along said horizontal guide members and provided with a vertical index projecting thereabove and crossing the said horizontal index in correspondence of the name of the station whose ticket is to be printed, recorded and accounted, means for locking said carraige to said magazine, means for hooking said matrix and carry same into the said printing carriage, and setting it in printing position, means for locking the matrix-hooking and extracting means when the said printing carriage is not locked to the magazine; means for maintaining said printing carriage locked to said magazine when a matrix is introduced in the carriage, a slit for the introduction of a ticket in said carriage, a ticket-carrying small carriage shiftable within said printing carriage from behind said slit to a position in correspondence of said matrix plate and vice versa, means for effecting said shiftings, means for causing the starting of the device by the introduction of the ticket into the printing carriage on said small ticket-carrying carriage, inking rollers on said last-named small carriage for inking said matrix plate when said rollers pass thereover, when the ticket is brought from behind said slit in the printing carriage, in its printing position in corresopndence of the matrix plate and means for compressing the said small carriage against the said matrix plate.

11. An automatic ticket printing machine embodying therein a stationary magazine arranged in a predetermined plane and including right angled rows and columns of stations, each adapted to removably receive a ticket printing matrix, a station name board arranged parallel with one face of said magazine and mounted for guided movement in the direction of said column, with said names on said board arranged in positions corresponding to that of said matrix stations in the magazine, a printing carriage including means operative to engage the selected matrix in the magazine and for moving the same to its printing position in said carriage and thereafter returning said matrix to the station in said magazine, means for mounting said carriage on said board for movement transversely thereof in the direction of said rows of matrix stations in the magazine to operatively locate said engaging means with respect to the station of the selected matrix, means for releasably locking said carriage against movement when said engaging means is located with respect to said last mentioned station, means actuating said matrix moving means in moving said selected matrix from its station to said printing position in said carriage and for returning said matrix to its station after a printing operation, a ticket receiving carriage mounted on the printing carriage for movement in a plane perpendicular to the plane of movement of said board and for arranging the ticket received thereby in operative position relative to the printing position of the matrix in said printing carriage, means causing a printing engagement between said ticket and said matrix, respectively, when in said printing position and means operative upon insertion of a ticket into said ticket carriage for initiating movement of said ticket receiving carriage to said printing position and the operation of said means causing said printing engagement between said ticket and said matrix, respectively.

12. An automatic ticket printing machine as set forth in claim 11, and wherein said magazine and said board are disposed in a vertical plane, the movement of the printing carriage transversely of the station board is in a horizontal plane and the movement of the ticket receiving board in the printing carriage is also in a horizontal plane perpendicular to said vertical plane and to said first mentioned horizontal plane.

13. An automatic ticket printing machine as set forth in claim 11 and wherein said means for causing a printing engagement between said ticket and said matrix, respectively, when in said printing position, includes a means movable in a plane at a right angle to that of the ticket receiving carriage for imparting movement of said ticket into printing engagement with said matrix when said ticket and said matrix are in said printing position.

14. An automatic ticket printing machine as set forth in claim 11 and wherein said printing carriage includes accounting mechanism that is movable with said printing carriage and is actuated by the selected matrix when in said printing position and further includes ticket data recording mechanism mounted on said printing engagement causing means, for movement therewith into and out of operative data recording position relative to said matrix in said printing position.

15. An automatic ticket printing machine as set forth in claim 11 and wherein said means for releasably locking the printing carriage against movement, when the matrix engagement means is located with respect to the selected matrix, is actuated by a turnable and longitudinally movable shaft.

16. An automatic ticket printing machine as set forth in claim 11 and wherein said matrix engaging means includes a latch swingable into and out of engagement with a notch in the matrix, and said latch is so swung by means carried by a part of said locking means for the printing carriage.

17. An automatic ticket printing machine as set forth in claim 11 and wherein said matrix moving means includes a member that reciprocates in a line of movement parallel to that of said matrix, and said member carries latch means for a hooked engagement with said matrix, and said latch means is moved into and out of hooked engagement with said matrix by means carried by said printing carriage locking means.

18. An automatic ticket printing machine as set forth in claim 11 and wherein said matrix moving means includes a longitudinally movable rack bar that carries a latch means for hooked engagement with said matrix, a second rack bar movable in timed relation but in opposition to the first mentioned rack bar, and means are provided between said second rack bar and said ticket receiving carriage for imparting movement to the latter.

19. An automatic ticket printing machine as set forth in claim 11 and wherein the magazine is located behind the station board, and said station board and said printing carriage are movable in planes at a right angle to each other and in a plane parallel to the front face of the magazine to move the matrix engaging means into operative position with respect to the selected matrix in said magazine.

20. An automatic ticket printing machine as set forth in claim 11 and wherein each column of matrix stations are provided at the front of each side thereof with recesses, and said locking means includes a part for engaging certain selected recesses, and said part carries a member for actuating said matrix engaging means to cause the same to have a releasable hooked engagement with a part of said matrix.

21. An automatic ticket printing machine as set forth in claim 11 and in which a station board and the printing carriage carry indices which coact in the relative movement between said board and carriage to locate the matrix moving means with respect to the station of the selected matrix.

22. An automatic ticket printing machine as set forth in claim 11 and wherein the magazine and the station board are disposed in a vertical plane and the movement of the printing carriage is transversely of the station board, the station board carrying a horizontal member and the printing carriage carrying a vertical member and which members indicate by their intersection in the relative movement between said board and printing carriage the position in the magazine of the selected matrix and its station for the location of said matrix moving means.

References Cited in the file of this patent

UNITED STATES PATENTS

| | | |
|---|---|---|
| 899,671 | Lebeis | Sept. 29, 1908 |
| 922,245 | Powers | May 16, 1911 |
| 1,091,498 | Friedlein | Mar. 31, 1914 |
| 2,044,367 | Purdy et al. | June 16, 1936 |
| 2,689,087 | Barberis | Sept. 14, 1954 |